United States Patent
Palaniappan

(10) Patent No.: US 10,417,133 B2
(45) Date of Patent: Sep. 17, 2019

(54) REFERENCE CACHE MAINTENANCE OPTIMIZER

(71) Applicant: INTERNATIONAL BUSINESS MACHINES CORPORATION, Armonk, NY (US)

(72) Inventor: Sathiskumar Palaniappan, Tamilnadu (IN)

(73) Assignee: International Business Machines Corporation, Armonk, NY (US)

(*) Notice: Subject to any disclaimer, the term of this patent is extended or adjusted under 35 U.S.C. 154(b) by 308 days.

(21) Appl. No.: 15/415,938

(22) Filed: Jan. 26, 2017

(65) Prior Publication Data

US 2018/0210838 A1 Jul. 26, 2018

(51) Int. Cl.
G06F 12/00 (2006.01)
G06F 12/0875 (2016.01)
G06F 8/41 (2018.01)
G06F 9/38 (2018.01)

(52) U.S. Cl.
CPC ........ *G06F 12/0875* (2013.01); *G06F 8/4434* (2013.01); *G06F 9/3834* (2013.01); *G06F 2212/452* (2013.01)

(58) Field of Classification Search
CPC .. G06F 12/0875; G06F 8/4434; G06F 9/3834; G06F 2212/452
See application file for complete search history.

(56) References Cited

U.S. PATENT DOCUMENTS

| 8,935,446 B1* | 1/2015 | Shilane ............... G06F 12/0871 710/62 |
| 9,043,555 B1* | 5/2015 | Khona .................. G06F 3/0683 711/118 |
| 9,280,481 B1 | 3/2016 | Ebdon et al. |
| 9,465,737 B1* | 10/2016 | Karmarkar ......... G06F 12/0802 |
| 2012/0166401 A1* | 6/2012 | Li ....................... G06F 16/1748 707/692 |
| 2013/0007027 A1 | 2/2013 | Hazel et al. |
| 2015/0019505 A1* | 1/2015 | Aronovich .......... G06F 16/1748 707/692 |

(Continued)

OTHER PUBLICATIONS

Peter Mell et al, The NIST Definition of Cloud Computing, National Institute of Standards and Technology, Publication 800-145, 2011.

(Continued)

*Primary Examiner* — Prasith Thammavong
(74) *Attorney, Agent, or Firm* — Patrick J. Daugherty; Daugherty & Del Zoppo Co., LPA

(57) ABSTRACT

Processors configured by aspects of the present invention optimize reference cache maintenance in a serialization system by serializing a plurality of objects into a buffer and determining whether any of the objects are repeated within the buffered serialized plurality. The configured processors insert an object repetition data signal within the serialized plurality of objects that indicates to a receiver whether or not any objects are determined to be repeated within the buffered serialized plurality of objects, and send the serialized plurality of objects with the inserted object repetition data signal as a single chunk to a receiver, wherein the inserted object repetition data signal conveys reference cache management instructions to the receiver.

20 Claims, 4 Drawing Sheets

(56) References Cited

U.S. PATENT DOCUMENTS

| | | | |
|---|---|---|---|
| 2015/0019507 A1* | 1/2015 | Aronovich | G06F 16/1748 |
| | | | 707/692 |
| 2015/0372910 A1* | 12/2015 | Janakiraman | H04L 45/74 |
| | | | 370/392 |
| 2016/0092483 A1 | 3/2016 | Raja et al. | |
| 2017/0161202 A1* | 6/2017 | Erez | G06F 12/0246 |

OTHER PUBLICATIONS

StackOverflow, Announcing Stack Overflow documentation, Java serialization, Kryo and the object graph, http://stackverflow.com/questions, 2012.

* cited by examiner

REFERENCE CACHE MAINTENANCE OPTIMIZER

BACKGROUND

A typical enterprise Java™ application may include a server servicing a lot of clients. (JAVA and all JAVA-based trademarks and logos are trademarks or registered trademarks of Oracle and/or its affiliates.) In a banking application example hundreds of customers connect to a server via client applications ("clients") to effect transactions on their account (make a balance enquiry, a withdrawal, etc.). Such transactions are actually a remote call to the server and require data to be exchanged between the client and server.

Distributed computing in JAVA makes use of Remote Method Invocation (RMI)-Java Remote Method Protocol (JRMP) and RMI-Internet Inter-ORB Protocol (IIOP) technologies, wherein "ORB" refers to an Object Request Broker.

JRMP is a JAVA-specific, stream based protocol for JAVA-to-JAVA remote calls, requiring both clients and server to use JAVA objects. RMI-IIOP denotes the JAVA RMI interface over the IIOP, which delivers Common Object Request Broker Architecture (CORBA) distributed computing capabilities to the JAVA platform. With features inherited from CORBA, software components that work together can be written in different languages (for example, C++ and JAVA).

Both RMI-JRMP and RMI-IIOP leverage JAVA serialization to communicate (transfer parameters) between components. Marshaling involves serialization and is a process of decomposing an instantiated object into a data format that may be transferred via a message. Un-marshaling is a process of reconstructing an instantiated object at a receiving device in response to receipt of a message, including an object formatted as serialized/marshaled data.

BRIEF SUMMARY

In one aspect of the present invention, a computerized method for optimizing reference cache maintenance in a serialization system includes executing steps on a computer processor. Thus, a computer processor configured by an aspect of the present invention serializes a plurality of objects into a buffer and determines whether any of the objects are repeated within the buffered serialized plurality. The configured processor inserts an object repetition data signal within the serialized plurality of objects that indicates to a receiver whether or not any objects are determined to be repeated within the buffered serialized plurality of objects, and sends the serialized plurality of objects with the inserted object repetition data signal as a single chunk to a receiver, wherein the inserted object repetition data signal conveys reference cache management instructions to the receiver.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured by an aspect of the present invention to serialize a plurality of objects into a buffer and to determine whether any of the objects are repeated within the buffered serialized plurality. The configured processor inserts an object repetition data signal within the serialized plurality of objects that indicates to a receiver whether or not any objects are determined to be repeated within the buffered serialized plurality of objects, and sends the serialized plurality of objects with the inserted object repetition data signal as a single chunk to a receiver, wherein the inserted object repetition data signal conveys reference cache management instructions to the receiver.

In another aspect, a computer program product for optimizing reference cache maintenance in a serialization system has a computer-readable storage medium with computer readable program code embodied therewith. The computer readable hardware medium is not a transitory signal per se. The computer readable program code includes instructions for execution which cause the processor to serialize a plurality of objects into a buffer and determine whether any of the objects are repeated within the buffered serialized plurality. The processor is further thereby configured to insert an object repetition data signal within the serialized plurality of objects that indicates to a receiver whether or not any objects are determined to be repeated within the buffered serialized plurality of objects, and send the serialized plurality of objects with the inserted object repetition data signal as a single chunk to a receiver, wherein the inserted object repetition data signal conveys reference cache management instructions to the receiver.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
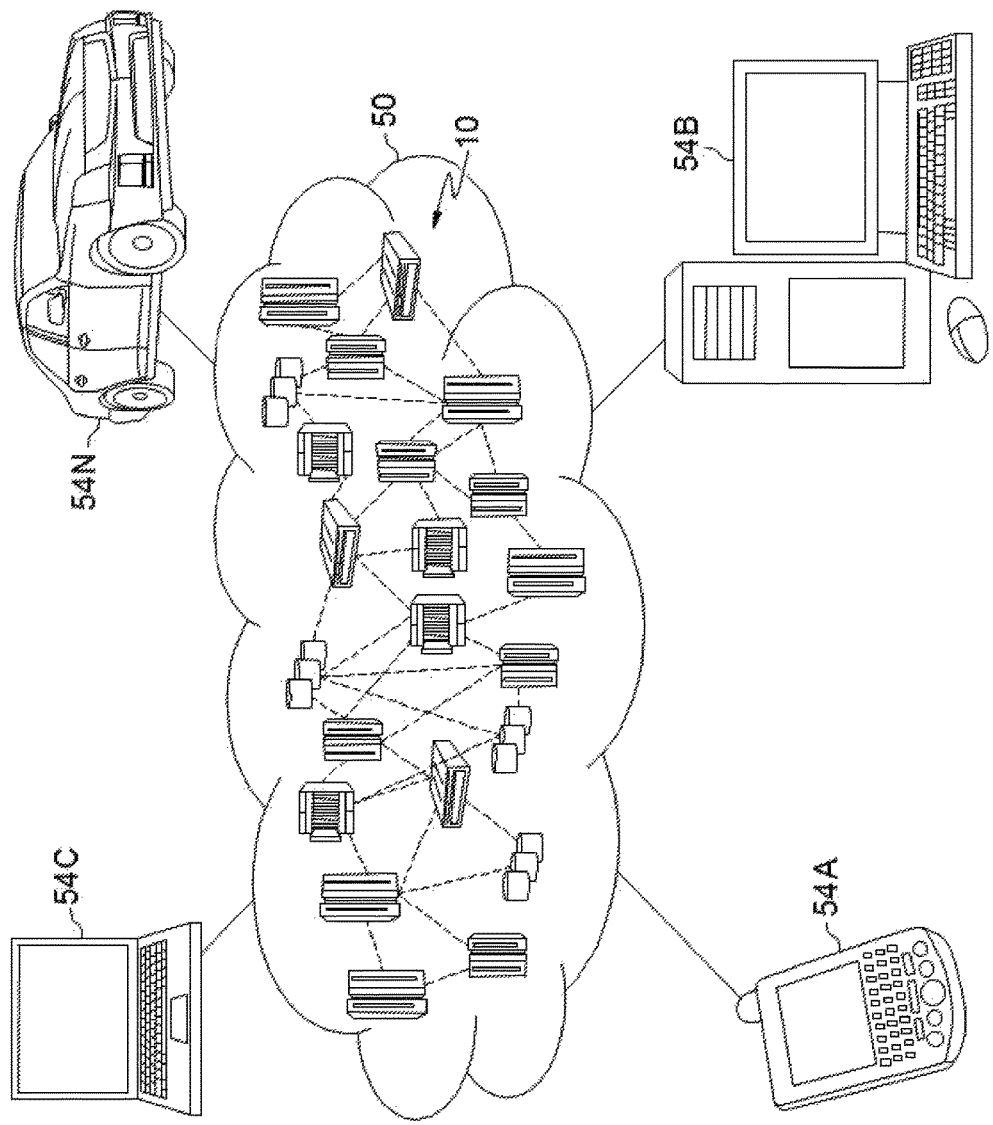
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
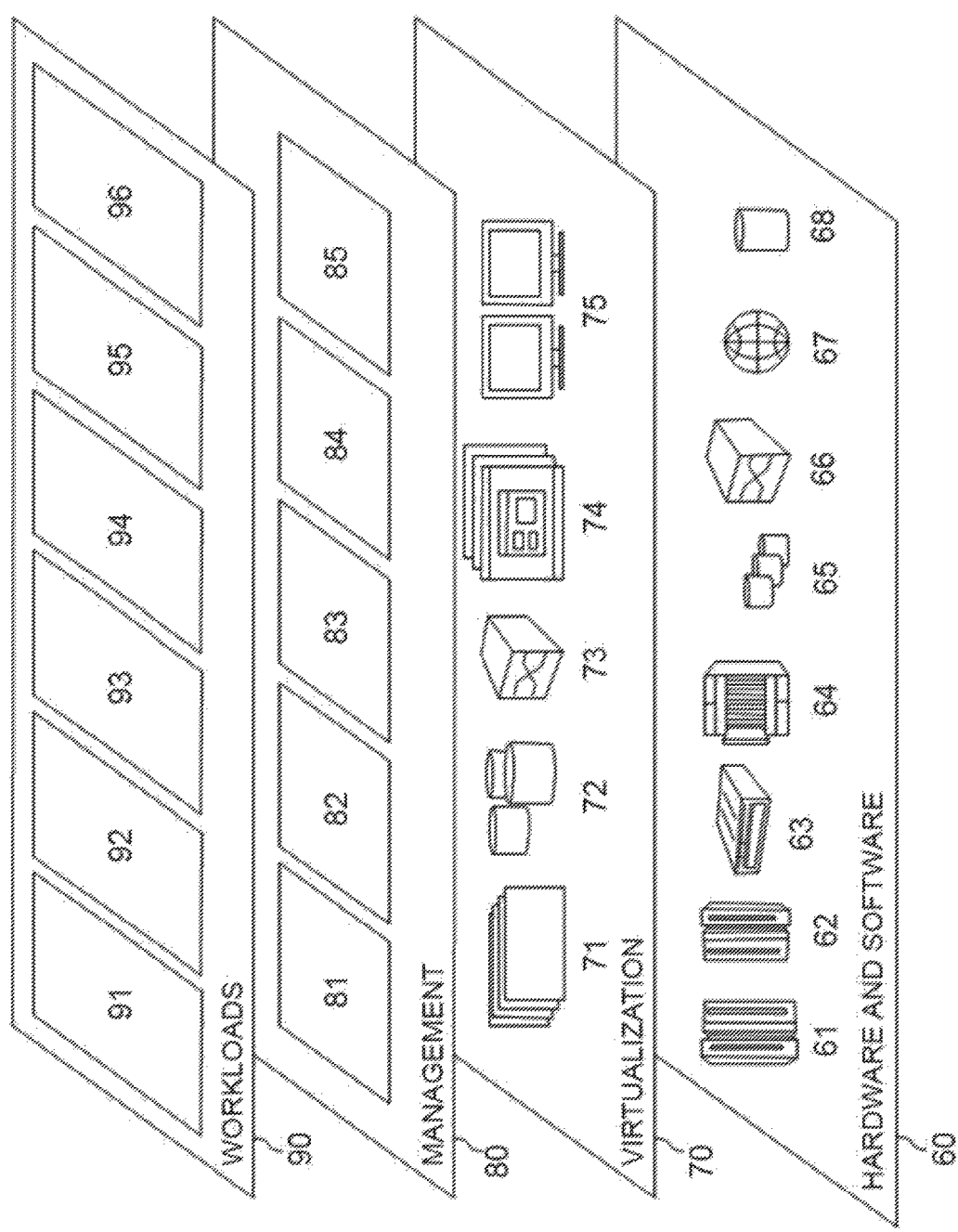
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
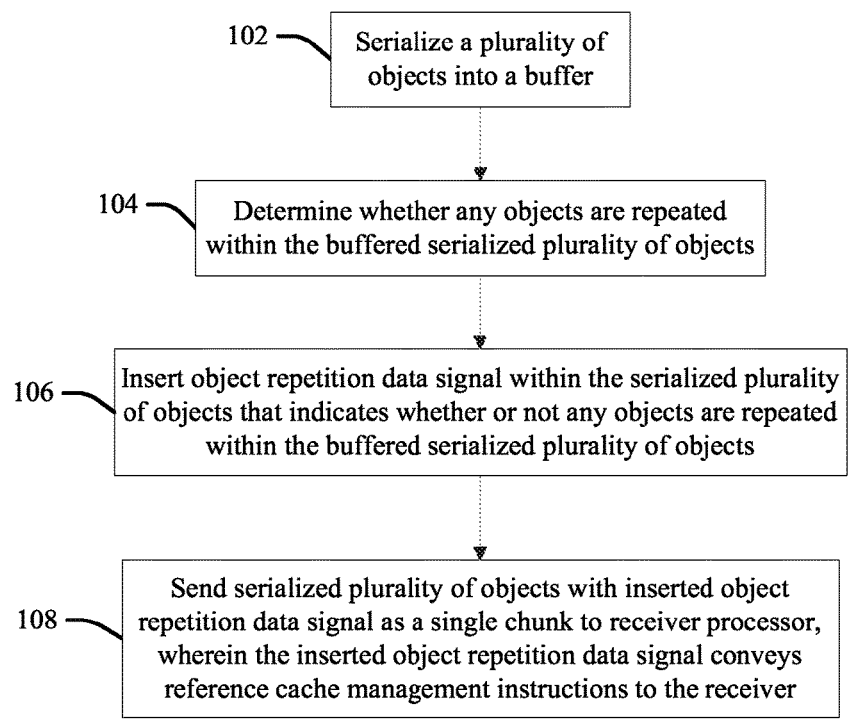
FIG. 4 is a flow chart illustration of a serialization system according to an embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for optimizing reference cache maintenance in a serialization system according to embodiments of the present invention, for example to execute the process steps or system components or tasks as depicted in FIG. 4 below.

Figure 3:
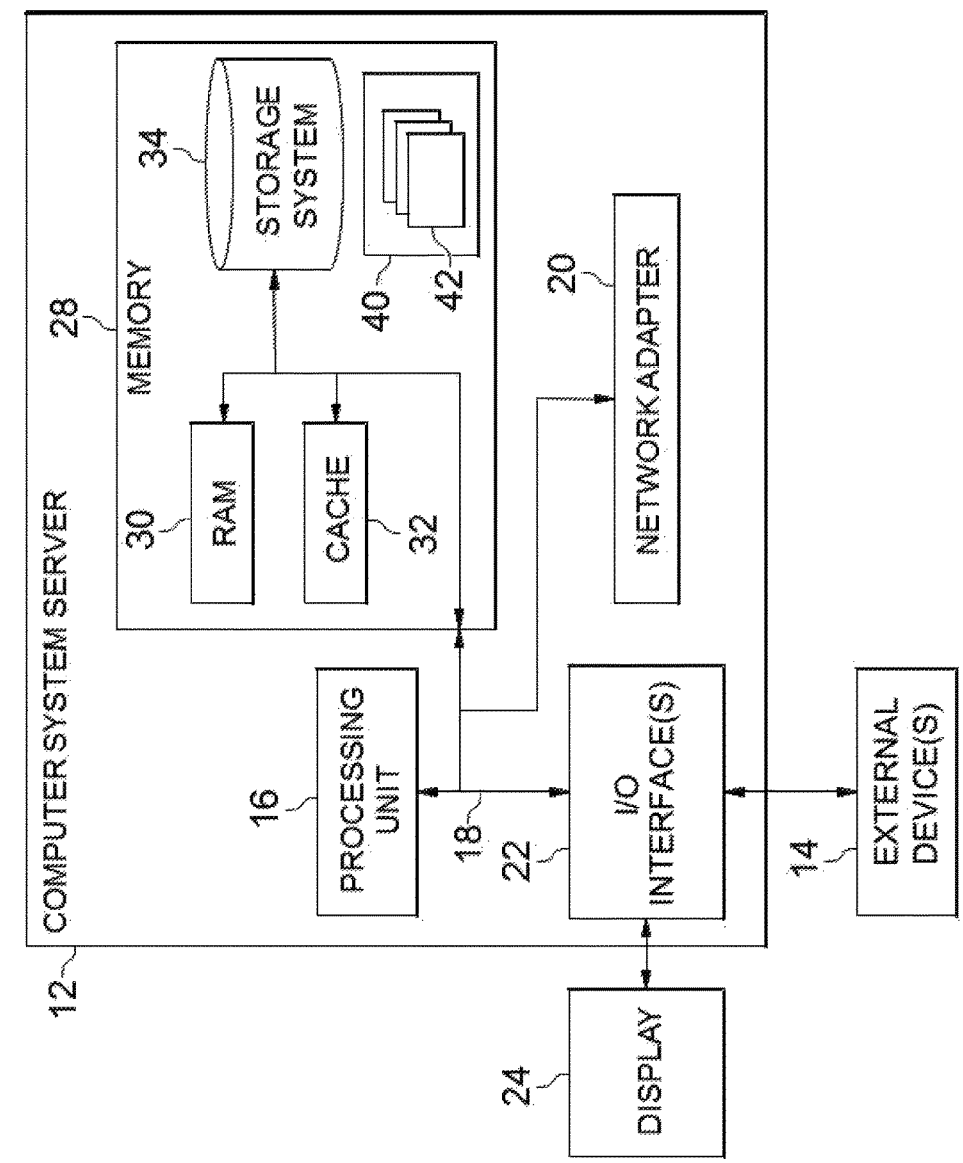
FIG. 3 is a schematic illustration of a programmable device according to an aspect of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Serialization plays an important role in the performance of a distributed cluster application, for example in an Apache Spark™ system, to persist Resilient Distributed Dataset (RDD) in memory, and to communicate task and staging related information between master and slave. (APACHE SPARK, SPARK and the SPARK logo are trademarks of the Apache Software Foundation (ASF) in the United States or other countries). Accordingly, it is desirable to optimize bottlenecks present in serialization frameworks to improve the performance of an overall application.

Serialization frameworks generally maintain a reference cache (for example, a handle table, a value cache, etc.) to replicate a same object graphed from a sender to a receiver. For example, consider the following object example (1):

```
public class SerializationExample implements java.io.Serializable {
    private String field1 = "Hello";
    private String field2 = field1;
}
```

Both members of class "SerializationExample" point to the same string object "Hello." In order to replicate the same graph to the other side, a computer system processor that is configured to provide a serialization framework (hereinafter sometimes the "serialization framework processor") caches the objects (top level object and its fields) into a reference cache when it is about to be serialized. Later if the serialization framework processor finds that the same object is present in the table (in this case "field2 "), it sends a special marker to a computer system processor that is configured to provide receiver functions (the "receiver") so that the receiver can point to same object and replicate the exact graph. The following is an example of a simple marshalling flow by the serialization framework processor that is associated with a reference cache:

(a) In response to input of the "SerializationExample" object for serialization, the serialization framework processor looks into the reference cache to see if it is already marshalled. (Since it is the first time this object is given for serialization in the present example, it is not present in the cache.)

(b) In response to determining that it is not already marshalled, the serialization framework processor adds the "SerializationExample" object into the reference cache and assigns a unique number, for example "0."

(c) Subsequently, in response to an input of "field1 " of the SerializationExample for serialization, the serialization framework processor performs a look-up in the reference cache for the string object "Hello" that is pointed to by the "field1 " input. In response to determining that said string object "Hello" is not present in the reference cache, the serialization framework processor adds the string object "Hello" into the reference cache.

(d) Subsequently, in response to an input of "field2 " for serialization, the serialization framework processor searches for and thereby find the entry in the reference cache added in step (c) above. In response, instead of marshalling the string object "Hello," the serialization framework processor sends a special marker to the receiver, so that the receiver can point to the object referenced (pointed to) by "field1."

The serialization framework processor associates a handle value "0" with the "SerializationExample" object, and a handle value "1" with the string object "Hello," within the reference cache. The following is a serialized form byte array (ORB) of the object example (1) described above, "RRMI:SerializationExample:A7EA 5821F9B8CF6p.Hellop.Hi":

```
0000: 7252524d 493a5365 7269616c 697a6174
0010: 696f6e45 78616d70 6c653a41 37454132
0020: 35383231 46394238 43463670 0 a72656c
0030: 6c6fff01
```

The first byte "0x 72" indicates that the serialized form represents an object, which is then followed by a repository identification (ID) in string format. The repository ID is formed by writing the name of the class followed by the Stream Unique Identifier (SUID) or serialVersionUID. A receiver uses the repository ID (especially the class name) to determine a type present in the serialized byte array. The receiver writes the repository ID of the top level object, starting with the fields present in the object ("field1 "), then the value tag ("0x 72"), then the content of the string "Hello". When the receiver encounters the next field ("field2 "), it finds that the string object pointed to by "field2 " is already serialized, and in response writes a special value tag "0xFF" indicated by the underlining emphasis above (wherein "FF" is a hexadecimal number which has an integer value of 255), followed by a handle associated with the object.

When the receiver side de-serializes the serialized form representing the object it encounters a value tag or special tag, and in response builds a similar reference cache (comprising the same handle value associations ("0" associated with the "SerializationExample" object, and "1" associated with the string object "Hello") but in reverse order relative to the reference cache of the sender, the serialization framework processor), and accordingly when it encounters the special tag "0xFF" it look into the reference cache to find the original object. The reference caches are maintained at both sender and receiver sides, wherein both need to cache all encountered unique objects; the reference caches are also maintained per stream.

Though costs may be saved by serializing a repeated object (such as the "field2 " "Hello" in the above example), maintaining a reference cache general requires significant overhead expenditures. For example, where an application server sends 27,000 records (with each record containing 17 reference fields) from a database to a web server, the sender and receiver each need to maintain a reference cache of about 3.5 MB (for about 459,000 references on a 64-bit platform), and also service multiple calls to resize the cache, without any one object being referenced twice.

Aspects of the present invention provide efficiencies over the prior art by reducing memory usage and the cost of reference cache maintenance at the receiver side, and providing overall throughput improvement, as a function of feedback and learning from sender.

FIG. 4 illustrates a process or system according to the present invention for optimizing reference cache maintenance in a serialization system. At 102 a processor that is configured to provide a serialization framework according to the present invention (the serialization framework processor) serializes a plurality of objects (messages) into a buffer, wherein the serialization includes determining at 104 whether any objects are repeated within the buffered serialized plurality of objects.

At 106 the serialization framework processor inserts an object repetition data signal within the serialized plurality of objects that indicates the result of the determination at 104 (whether or not any objects are repeated within the buffered serialized plurality of objects). Examples of inserting an object repetition data signal at 106 include the following three schemas:

Schema (i): inserting an extra byte of information before a start of a first top level object that indicates whether a current object graph in a reference cache generated by the serializing the plurality of objects into the buffer has a repeated object or not;

Schema (ii): inserting, immediately after an extra byte of information inserted according to schema (i) (before the start of the first top level object) that indicates the serialized plurality of objects has a repeated object, secondary bytes of information that comprise a list of handles of the objects that are repeated in the serialized plurality of objects; and Schema (iii) inserting a special value tag encoding an object determined to be repeated within the serialized plurality of objects, at a location of the repeated objected within the serialized plurality of objects.

At 108 the serialization framework processor sends the serialized plurality of objects with the inserted object repetition data signal as a single chunk to another processor configured to act as a receiver, wherein the inserted object repetition data signal conveys reference cache management instructions to the receiver.

In ORB messages are first serialized into a local buffer (a byte array maintained in an ORB layer) and then transferred to the remote server in one chunk or multiple chunks based on user preferences. Buffering all marshalled data in one chunk and transferring to a receiver generally provides for better performance relative to sending multiple chunks, and accordingly aspects of the present invention generally use the one chunk mode.

Thus, according to an aspect of the present invention that applies schema (i), a serialization framework processor according to the present invention inserts an extra byte of information before the start of the first top level object and initializes the extra byte value to zero (setting the extra byte value to "0x0"), which signifies to a receiver there is no repeated object encountered in the object graph (during the determination at 104 as to whether any objects are repeated within the buffered serialized plurality of objects), and therefore that the receiver doesn't need to maintain the reference cache at all. Otherwise, in response to determining (at 104) that an object is repeated as it serializes the object graph, the serialization framework processor updates the byte value to "0x01", which signals to the receiver that an object is repeated within the serialized plurality of objects.

The serialization framework processor is enabled to determine whether any object is repeated through its functions in maintaining the reference cache: for example, in response to writing a special tag 0xFF the serialization framework processor modifies the first byte of the serialized byte array to 0x01, and otherwise it stays at its initialized value (0x00). Based on this byte information, the receiver thus either creates and maintains a reference cache on the receiver side (in response to the value of 0x01), or does not create a receiver side reference cache at all (in response to the value of 0x00).

For example, the following object example (2) does not have any repetitions:

```
public class SerializationExample implements java.io.Serializable {
    private String field1 = "Hello";
    private String field2 = "Hi";
}
```

Accordingly, the following first serialized form (SF1) is generated by the serialization framework processor that uses the (i) extra byte of information schema described above:
  0000: <u>00</u>752524d 493a5365 7269616c 697a61
  0010: 74696f6e45 78616d70 6c653a41 374541
  0020: 3235383231 46394238 43463670 0a4865
  0030: 6c6c6f7004 4869;
wherein the underline first byte value carries the information about the repetition determination: since there is no repetition, it carries the value "0x00." This indicates to the receiver processor that is doesn't need to create or maintain the reference cache.

In another aspect of the present invention that uses schema (ii), a serialization framework processor according to the present invention serializes the object example (1), discussed above:

```
public class SerializationExample implements java.io.Serializable {
    private String field1 = "Hello";
    private String field2 = field1;
}
```

The present aspect generates the following second serialized form (SF2) from the object example (1):
  0000: <u>01010172</u> 52524d49 3a536572 69616c69
  0010: 7a617469 6f6e4578 616d706c 653a4137
  0020: 45413235 38323146 39423843 4636700a
  0030: 72656c6c 6fff02
As shown above, the underlined first byte of the second serialized form (SF2) carries the information that there are repetitions in the current serialized graph ("01"), and the next few secondary (underlined) bytes carry the information about the list of handles that are repeated in the serialized object: the number of repetitions (length) in a first subset of the secondary bytes, followed immediately thereafter by a second subset of the secondary bytes that comprises the list of handle values of the repeated objects. In this example there is only one object repeated, and hence the 2nd byte carries the length (0x01), then the actual handle is carried at the third byte (0x01).

In this case the serialization framework processor as sender creates a small byte array (repeated handles array) in order to keep data generated from the repeated object handles. Whenever an object is determined to be repeated, the serialization framework processor writes the handle of the object (retrieved from the reference cache) onto this new byte array. At the end of the process of determining object repetition the serialization framework processor flushes (deletes) repeated handles from the handle byte for objects that are repeated more than once within the serialized content array, before sending out to the receiver. The first byte carrying the repeated information in the second serialized form (SF2) is written in the repeated handles byte array itself, so that it appears first.

In some aspects, in response to determining a large plurality of repetitive object handles (meeting a threshold value), the serialization framework processor replaces the first, extra byte array with a predefined unique data signal value (for example, the byte value "0x02") at the start of the serialization, to thereby notify the receiver to maintain the reference cache for all the objects.

In generating the second serialized form (SF2) the serialization framework for the present example the processor builds the reference cache only for one handle in association with the "Hello" object, as this is the only object that has been determined to be repeated within said serialized form. This provides advantages over the prior art by saving memory space as well as resize time costs.

The overhead incurred with the second subset bytes (the handle byte array) is not relatively large. For example, in the case where there are 100 repetitions, the handle byte array requires about 900 bytes (about 100 bytes of extra memory to carry the repetition information from the sender to receiver, and about 800 bytes to cache those repetitions), compared to about 3.5 MB required under prior art reference cache maintenance approaches. Also, the maximum size of the array can be set (for example to about 1 KB), wherein if the number of repetitions is large enough that the handle data cannot be contained within the set maximum amount (it exceeds this threshold value), the serialization framework processor reverts back to a standard or non-optimized mode, where the receiver will need to maintain all the references in the reference cache.

Another aspect of the present invention uses schema (iii) discussed above, wherein the inserted object repetition data signal used is a special value tag encoding an object determined to be repeated within the serialized plurality of objects at the location of the repeated objected within the serialized plurality of objects, and thus the receiver maintains only those references. The present aspect is an ORB example that uses (0x72) as a value tag to represent a start of any object, and (0xFF) to represent a repeated object, which is followed by the handle of the object. The idea here is to maintain the location of the array in which this object is originally serialized along, with the handle.

Thus, with respect to another object serialization example (3), object "SerializationExample" having a (handle, offset) value of (0,0), and string object "Hello" repeated therein having a (handle, offset) value of (1,44), the serialization framework processor utilizing schema (iii) generates the following third serialized form (SF3) after writing "field1" and before writing "field2":
  0000: 01725252 4d493a53 65726961 6c697a61
  0010: 74696f6e 4578616d 706c653a 41374541
  0020: 32353832 31463942 38434636 <u>72</u>0a4865
  0030: 6c6c6f;
  wherein the start of "field1" ("Hello") is the underlined value "72" at location "44".

Said serialization framework processor utilizing schema (iii) generates the following fourth serialized form (SF4) after writing "field2":
  0000: 01725252 4d493a53 65726961 6c697a61
  0010: 74696f6e 4578616d 706c653a 41374541
  0020: 32353832 31463942 38434636 <u>EE</u>0a4865
  0030: 6c6c6f;
  wherein the value at location 44 is modified to "0xEE" to convey to the receiver that this object is repeated later. This improves efficiency for the receiver, which may add those objects in the reference cache for which the special tag "0XEE" appears in the serialization buffer, and hence reduce memory and reduce reference cache costs.

Though the schema (iii) approach adds overhead at the sender side (to cache the array location of each object), it reduces the overhead at the receiver side. De-serialization may take a little more time compared to serialization (due to the fact that the receiver needs to load the class and create the object, whereas in the serialization side the object is already present). However, advantages gained in reducing memory requirements on the receiver side will generally outweigh any disadvantages caused by such time differentials, particularly where the de-serialization side has less memory compared to serialization side, such as in the case of an application server sender that is responding to mobile device receiver. Moreover, aspects using schema (iii) do not add any overhead in the case of an ORB serializer in Common Data Representation format, because in this case the reference cache uses the offset (array location) as the handle instead of the sequence number.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for optimizing reference cache maintenance in a serialization system, comprising executing on a computer processor the steps of:
  serializing a plurality of objects into a buffer;
  determining whether any of the plurality of objects are repeated within the buffered serialized plurality of objects;
  inserting an object repetition data signal within the serialized plurality of objects that indicates whether or not any objects are determined to be repeated within the buffered serialized plurality of objects; and
  sending the serialized plurality of objects with the inserted object repetition data signal as a single chunk to a receiver, wherein the inserted object repetition data signal conveys reference cache management instructions to the receiver; and
  wherein the step of inserting the object repetition data signal is selected from the group consisting of:
  inserting an extra byte of information within the serialized plurality of objects before a start of a first top level object of the plurality of objects, wherein the extra byte of information indicates whether a current object graph in a reference cache generated by the serializing the plurality of objects into the buffer has a repeated object; and
  encoding a repeated object with a special value tag at a location of the repeated object within the serialized plurality of objects, wherein the repeated object is determined to be repeated within the serialized plurality of objects.

2. The method of claim 1, wherein the step of inserting the object repetition data signal is the encoding the repeating object with the special value tag at the location of the repeated object within the serialized plurality of objects, the method further comprising:
  inserting a first hexadecimal number value at a start of the location of the repeated object within the serialized plurality of objects; and
  inserting a handle of the repeated object immediately after the first hexadecimal number value.

3. The method of claim 2, further comprising:
  prior to sending the serialized plurality of objects with the inserted object repetition data signal as the single chunk to the receiver processor, modifying the inserted first hexadecimal number value to a different, second value in response to determining another repetitive occurrence of the repeated object.

4. The method of claim 1, wherein the step of inserting the object repetition data signal is the inserting the extra byte of information within the serialized plurality of objects before the start of the first top level object of the plurality of objects, the method further comprising:
  initializing the inserted extra byte value to an initial value that signifies to the receiver that there is no repeated object within the buffered serialized plurality of objects; and
  updating the initial value of the inserted extra byte value to a different value in response to determining that an object is repeated within the serialized plurality of objects, wherein the different value signifies to the receiver there is a repeated object within the buffered serialized plurality of objects.

5. The method of claim 4, further comprising:
  inserting secondary bytes of information within the serialized plurality of objects immediately after the first byte of information that comprise a list of handles of objects that are repeated in the serialized plurality of objects.

6. The method of claim 5, wherein the step of inserting the secondary bytes of information within the serialized plurality of objects comprises:
  inserting a first subset of bytes that indicates a number of object repetitions; and
  inserting a second subset of the secondary bytes immediately after the first subset that comprises a list of handle values of each of the repeated objects.

7. The method of claim 6, further comprising:
  deleting from the second subset of the secondary bytes handle values of additional occurrences of one of the repeated objects.

8. The method of claim 6, further comprising:
  in response to determining that a total number of object handles within the second subset of the secondary bytes meets a threshold value, replacing the different value of the inserted extra byte value that signifies to the receiver there is a repeated object within the buffered serialized plurality of objects with a third value that notifies the receiver to maintain a reference cache for the serialized plurality of objects.

9. The method of claim 1, further comprising:
  integrating computer-readable program code into a computer system comprising a processor, a computer readable memory in circuit communication with the processor, and a computer readable storage medium in circuit communication with the processor; and
  wherein the processor executes program code instructions stored on the computer-readable storage medium via the computer readable memory and thereby performs the steps of serializing the plurality of objects into the buffer, determining whether any of the plurality of objects are repeated within the buffered serialized plurality of objects, inserting the object repetition data signal within the serialized plurality of objects, and sending the serialized plurality of objects with the inserted object repetition data signal as the single chunk to the receiver.

10. The method of claim 9, wherein the computer-readable program code is provided as a service in a cloud environment.

11. A system, comprising:
  a processor;
  a computer readable memory in circuit communication with the processor; and
  a computer readable storage medium in circuit communication with the processor;
  wherein the processor executes program instructions stored on the computer-readable storage medium via the computer readable memory and thereby:
  serializes a plurality of objects into a buffer;
  determines whether any of the plurality of objects are repeated within the buffered serialized plurality of objects;
  inserts an object repetition data signal within the serialized plurality of objects that indicates whether or not any objects are determined to be repeated within the buffered serialized plurality of objects; and
  sends the serialized plurality of objects with the inserted object repetition data signal as a single chunk to a receiver, wherein the inserted object repetition data signal conveys reference cache management instructions to the receiver; and
  wherein the processor inserts an object repetition data signal that is selected from the group consisting of:
  an extra byte of information inserted within the serialized plurality of objects before a start of a first top level object of the plurality of objects, wherein the extra byte of information indicates whether a current object graph in a reference cache generated by the serializing the plurality of objects into the buffer has a repeated object; and
  a special value tag that encodes a repeated object at a location of the repeated object within the serialized plurality of objects, wherein the repeated object is determined to be repeated within the serialized plurality of objects.

12. The system of claim 11, wherein the processor executes the program instructions stored on the computer-readable storage medium via the computer readable memory and thereby inserts the special value tag that encodes the repeated object as the inserted object repetition data signal, via:
  inserting a first hexadecimal number value at a start of the location of the repeated object within the serialized plurality of objects; and
  inserting a handle of the repeated object immediately after the first hexadecimal number value.

13. The system of claim 12, wherein the processor executes the program instructions stored on the computer-readable storage medium via the computer readable memory and thereby further, prior to sending the serialized plurality of objects with the inserted object repetition data signal as the single chunk to the receiver processor, modifies the inserted first hexadecimal number value to a different, second value in response to determining another repetitive occurrence of the repeated object.

14. The system of claim 11, wherein the processor executes the program instructions stored on the computer-readable storage medium via the computer readable memory and thereby:
  inserts the extra byte of information within the serialized plurality of objects before the start of the first top level object of the plurality of objects as the inserted object repetition data signal;

initializes the inserted extra byte value to an initial value that signifies to the receiver that there is no repeated object within the buffered serialized plurality of objects; and updates the initial value of the inserted extra byte value to a different value in response to determining that an object is repeated within the serialized plurality of objects, wherein the different value signifies to the receiver there is a repeated object within the buffered serialized plurality of objects.

15. The system of claim 11, wherein the processor executes the program instructions stored on the computer-readable storage medium via the computer readable memory and thereby:

inserts secondary bytes of information within the serialized plurality of objects immediately after the first byte of information that comprise a list of handles of objects that are repeated in the serialized plurality of objects.

16. The system of claim 15, wherein the processor executes the program instructions stored on the computer-readable storage medium via the computer readable memory and thereby inserts the secondary bytes of information within the serialized plurality of objects by:

inserting a first subset of bytes that indicates a number of object repetitions; and inserting a second subset of the secondary bytes immediately after the first subset that comprises a list of handle values of each of the repeated objects.

17. The system of claim 16, wherein the processor executes the program instructions stored on the computer-readable storage medium via the computer readable memory and thereby:

deletes from the second subset of the secondary bytes handle values of additional occurrences of one of the repeated objects; and in response to determining that a total number of object handles within the second subset of the secondary bytes meets a threshold value, replaces the different value of the inserted extra byte value that signifies to the receiver there is a repeated object within the buffered serialized plurality of objects with a third value that notifies the receiver to maintain a reference cache for the serialized plurality of objects.

18. A computer program product for optimizing reference cache maintenance in a serialization system, the computer program product comprising:

a computer readable storage medium having computer readable program code embodied therewith, wherein the computer readable storage medium is not a transitory signal per se, the computer readable program code comprising instructions for execution by a processor that cause the processor to:

serialize a plurality of objects into a buffer;

determine whether any of the plurality of objects are repeated within the buffered serialized plurality of objects;

insert an object repetition data signal within the serialized plurality of objects that indicates whether or not any objects are determined to be repeated within the buffered serialized plurality of objects; and send the serialized plurality of objects with the inserted object repetition data signal as a single chunk to a receiver, wherein the inserted object repetition data signal conveys reference cache management instructions to the receiver; and wherein the computer readable program code instructions for execution by the processor further cause the processor to insert an object repetition data signal that is selected from the group consisting of:

an extra byte of information inserted within the serialized plurality of objects before a start of a first top level object of the plurality of objects, wherein the extra byte of information indicates whether a current object graph in a reference cache generated by the serializing the plurality of objects into the buffer has a repeated object; and a special value tag that encodes a repeated object at a location of the repeated object within the serialized plurality of objects, wherein the repeated object is determined to be repeated within the serialized plurality of objects.

19. The computer program product of claim 18, wherein the computer readable program code instructions for execution by the processor further cause the processor to insert the special value tag that encodes the repeated object as the inserted object repetition data signal, via:

inserting a first hexadecimal number value at a start of the location of the repeated object within the serialized plurality of objects; and inserting a handle of the repeated object immediately after the first hexadecimal number value.

20. The computer program product of claim 19, wherein the computer readable program code instructions for execution by the processor further cause the processor to, prior to sending the serialized plurality of objects with the inserted object repetition data signal as the single chunk to the receiver processor, modify the inserted first hexadecimal number value to a different, second value in response to determining another repetitive occurrence of the repeated object.

* * * * *